F. R. CALDWELL.
NUT LOCK.
APPLICATION FILED DEC. 10, 1914.
1,172,669.
Patented Feb. 22, 1916.
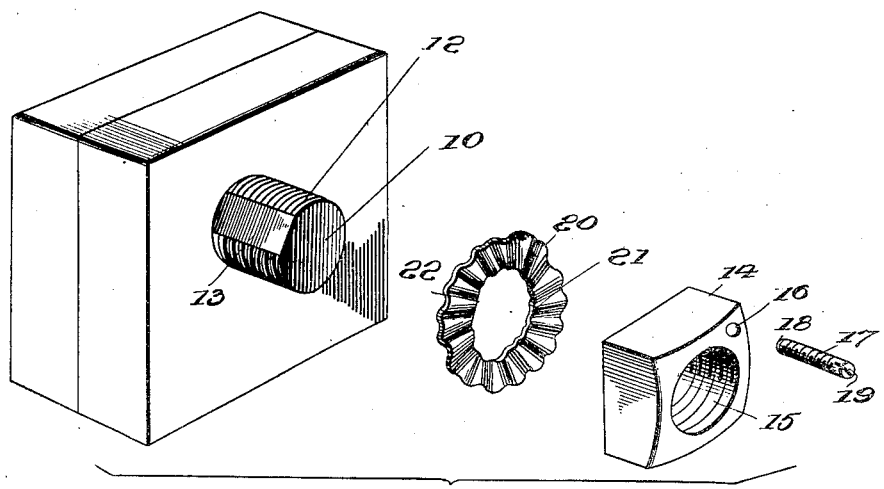
Fig. 1.
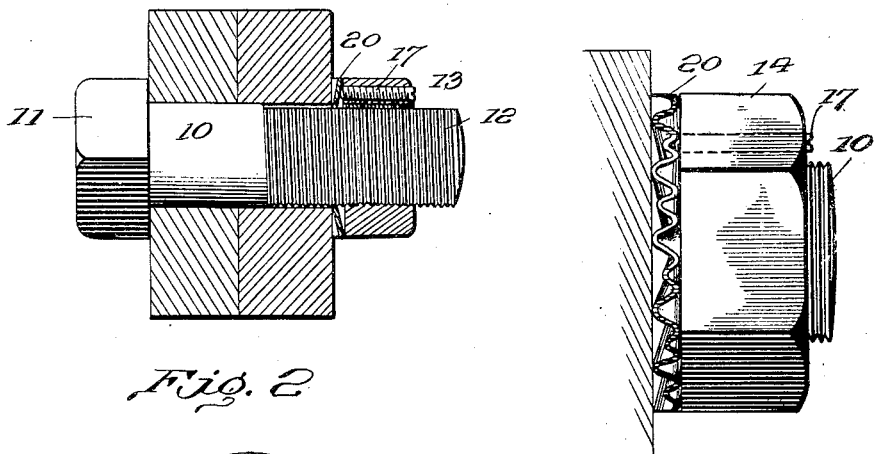
Fig. 2.
Fig. 3.
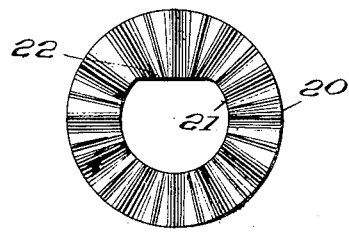
Fig. 4.
Witnesses
Inventor
F. R. Caldwell
By
Attorneys

UNITED STATES PATENT OFFICE.

FRANK R. CALDWELL, OF SOUTH KNOXVILLE, TENNESSEE.

NUT-LOCK.

1,172,669.   Specification of Letters Patent.   Patented Feb. 22, 1916.

Application filed December 10, 1914. Serial No. 876,526.

*To all whom it may concern:*

Be it known that I, FRANK R. CALDWELL, a citizen of the United States, residing at South Knoxville, in the county of Knox and State of Tennessee, have invented certain new and useful Improvements in Nut-Locks, of which the following is a specification.

This invention contemplates a new and improved nut lock and has as its primary object to provide a construction of this character which will include but few and simple parts and wherein the nut may be positively locked upon the bolt at substantially any point in its turning movement thereon. The invention has as a further object to provide an improved nut lock which may be readily applied in use, and wherein mutilation of the threads of the bolt will be obviated. And a still further object of the invention is to provide an improved nut lock which will coact with the nut in such manner that when applied, it will positively connect the nut with the bolt and will also cause a slight pivotal movement of the nut upon the bolt to bring the threads of the nut into wedging engagement with the threads of the bolt.

Other and incidental objects will appear as the description proceeds and in the drawings, wherein I have illustrated the preferred embodiment of my invention and wherein similar reference characters designate corresponding parts throughout the several views, Figure 1 is a perspective view of my improved nut lock showing the parts thereof detached from each other but in proper relative position, Fig. 2 is a horizontal section showing the parts assembled upon the bolt, Fig. 3 is a side elevation particularly showing the manner in which the locking key is disposed to engage the locking washer, and Fig. 4 is a detail view of the locking washer.

Referring more particularly to the drawings, I employ a bolt 10 which, in general configuration, may be of any conventional type being provided with a head 11 and being screw threaded adjacent its opposite extremity as at 12. Upon one side and coextensive with the threaded portion thereof, the bolt 10 is cut away to provide a flat face 13.

Detachably fitting upon the bolt 10 in the usual manner, is a nut 14 which may be of any desired configuration and which is formed centrally with a suitable screw threaded bore 15, the threads of which are disposed to engage the threads of the bolt. Upon one side thereof and spaced from the bore 15, the nut 14 is provided with a second internally screw threaded bore 16, the axis of which is parallel with the axis of the bore 15.

As clearly illustrated in the drawings, the bore 16 is of less diameter than the bore 15 and in the instance where a rectangular nut is employed such as I have shown, the bore 16 is preferably arranged to extend through one corner of the nut. Detachably fitting within the bore 16 is a key 17, the said key being in the nature of an externally threaded screw or pin, the threads of which are disposed to engage the threads of the bore 16. The screw 17 at one extremity is preferably provided with a substantially conical head 18, this being for a reason which will presently appear and at its opposite extremity, is notched as at 19 to receive the bit of a screw-driver or other similar tool.

In connection with the structure thus described, I employ a locking ring or washer 20. The washer 20 is preferably formed from suitable resilient sheet metal and is corrugated throughout its entire circumference, the ridges and furrows of the corrugations extending radially of the washer as shown in the drawings. Preferably, alternate corrugations of the washer are of less length than the intermediate corrugations, or, in other words, alternate furrows formed by the corrugations in the washer are of less depth than the intermediate furrows, this being best shown in Fig. 3 of the drawings. The washer 20 is formed with a central opening 21 disposed to receive the bolt 10 which opening is provided with a straight side or wall 22 disposed to engage the flat face 13 of the bolt.

In assembling the structure, the bolt 10 is passed through the work in the usual manner as shown in the drawings and the washer 20 is fitted upon the bolt to seat against the work. The nut 14 is then applied and screwed down upon the shank of the bolt to seat against the washer. In this connection, it will be observed that upon the tightening of the nut against the washer 20, the corrugations thereof will tend to flatten and since the said washer is preferably resilient, it will thus yieldably engage both the work and the nut to consequently eliminate any possible vibration between the parts and further tend to hold the nut stationary upon the bolt. The key 17 is then applied to the nut in the manner heretofore described and is screwed down within the bore 16 with its terminal 18 in secure engagement with the washer 20. The purpose of providing the conical terminal 18 for the key is now apparent since, by such construction, the key will bite into the washer to effectually connect the bolt therewith. In view of this fact and owing to the presence of the corrugations in the washer, the possibility of the movement of the terminal of the key over the upper face of the washer which would, as will be readily understood, permit the retrograde movement of the nut, will be reduced to a minimum. Under ordinary circumstances, the inner terminal of the key 17 will engage the washer 20 within one of the furrows thereof, which furrow will, as will be seen, present oppositely inclined faces disposed in the path of the possible movement of the key circumferentially of the washer.

The washer being connected with the bolt by the engagement of its flat side 22 with the flat side 13 of the bolt, it will thus be seen that the nut 14 is positively connected with the bolt through the medium of the key 17. However, particular attention is now called to the fact that when the key 17 is moved within its bore 16 to engage the washer, the nut 14 will tend to pivot upon the bolt to cause the threads of the nut to move into wedging engagement with the threads of the bolt, the upper wall of one thread upon one side of the nut engaging the lower face of an adjacent thread upon one side of the bolt and the lower wall of one thread upon the opposite side of the nut engaging the upper wall of an adjacent thread upon the opposite side of the bolt. It will thus be seen that the key 17 while coacting with the washer 20 to maintain the nut stationary upon the bolt, will also coact with the nut in such manner as to cause it to move into wedging engagement upon the bolt. The efficiency of the construction is thus enhanced, since, by such arrangement, the possibility of any vibration of the nut upon the bolt is further reduced to a minimum. Preferably, the inner terminal of the key 17 is engaged within one of the shallow furrows formed by the corrugations in the washer and thus the washer will, under ordinary circumstances, provide a yieldable abutment for the key 17 so that the said washer will normally act to yieldably hold the threads of the nut in wedging engagement with the threads of the bolt. This feature of construction performs a twofold function first, in that the washer through its yieldable engagement with the key 17, will normally act to hold the key seated within the bore 16, and second, said washer will, as above stated, yieldably hold the threads of the nut in wedging engagement with the threads of the bolt so that under severe strain, stripping or mutilation of the threads of the bolt or of the nut, will be obviated. It will therefore be seen that I provide a very efficient construction for the purpose set forth which is composed of few and simple parts, and wherein the nut may be locked upon the bolt at substantially any point in its turning movement thereon.

Having thus described my invention, what I claim and desire to secure by Letters Patent is:—

1. A device of the character described including a nut bored to engage a bolt, a corrugated locking washer formed to engage the bolt and providing a seat for the nut, alternate furrows of the corrugations of the washer being of less depth than the intermediate furrows, and a key carried by the nut and engaging within one of said alternate furrows.

2. A device of the character described including a nut bored to engage a bolt, a locking washer formed to engage the bolt, said washer being provided with a yieldably supported inclined face, one extremity of said face being disposed between planes comprehending the opposite side faces of the washer, and a key carried by the nut and engaging the washer upon one side of the said face.

3. A device of the character described including a bolt formed to receive a nut and provided with a flat side face, a nut engaging the bolt, a resilient corrugated locking washer having an opening formed therein to receive the bolt and provided with a flat face engaging the flat face of the bolt, alternate furrows of the corrugations of the washer being of less depth than the intermediate furrows, said nut upon one side being provided with an internally screw threaded bore having its axis arranged parallel to the axis of the nut, and an externally screw threaded key detachably fitting within said bore, said key being provided with a pointed terminal engaging within one of said intermediate furrows.

4. A device of the character described including a nut bored to engage a bolt, a locking washer adapted to engage the bolt, said washer being formed with intersecting oppositely inclined faces yieldably supported with their intersecting extremities arranged medially of the washer, and a key arranged eccentric to the axis of the nut and adjustable thereon to engage said inclined faces at the intersection thereof.

In testimony whereof I affix my signature in presence of two witnesses.

FRANK R. CALDWELL. [L. S.]

Witnesses:
J. A. JONES,
T. O. McCALLIE.